(12) United States Patent
Williams et al.

(10) Patent No.: US 7,938,444 B2
(45) Date of Patent: May 10, 2011

(54) MOUNTING BRACKET FOR TETHER RELEASE MECHANISM

(75) Inventors: Jeffrey D. Williams, Roy, UT (US); Larry Rose, South Weber, UT (US)

(73) Assignee: Autoliv ASP, Inc., Ogden, UT (US)

( * ) Notice: Subject to any disclaimer, the term of this patent is extended or adjusted under 35 U.S.C. 154(b) by 128 days.

(21) Appl. No.: 12/251,262

(22) Filed: Oct. 14, 2008

(65) Prior Publication Data
US 2010/0090445 A1 Apr. 15, 2010

(51) Int. Cl.
*B60R 21/2338* (2011.01)
*B60R 21/276* (2006.01)
*B60R 21/20* (2011.01)

(52) U.S. Cl. .............. 280/743.2; 280/728.2; 280/739

(58) Field of Classification Search .......... 280/743.2, 280/728.2, 743.1, 739
See application file for complete search history.

(56) References Cited

U.S. PATENT DOCUMENTS

| | | | |
|---|---|---|---|
| 4,057,026 A | 11/1977 | Nabucet et al. | |
| 4,453,292 A | 6/1984 | Bakker | |
| 5,269,098 A | 12/1993 | Redman | |
| 5,458,364 A * | 10/1995 | Mueller et al. | 280/728.2 |
| 5,718,531 A | 2/1998 | Mutschler, Jr. et al. | |
| 5,771,742 A | 6/1998 | Bokaie et al. | |
| 5,887,894 A | 3/1999 | Castagner et al. | |
| 6,076,854 A | 6/2000 | Schenck et al. | |
| 6,164,689 A | 12/2000 | Rivin et al. | |
| 6,238,438 B1 | 5/2001 | Fischer et al. | |
| 6,299,203 B1 | 10/2001 | Muller | |
| 6,390,501 B1 | 5/2002 | Greib et al. | |
| 6,454,300 B1 | 9/2002 | Dunkle et al. | |
| 6,511,094 B2 | 1/2003 | Thomas et al. | |
| 6,513,835 B2 | 2/2003 | Thomas | |
| 6,561,545 B2 | 5/2003 | Greib et al. | |
| 6,565,114 B1 * | 5/2003 | Thomas | 280/728.2 |
| 6,581,964 B2 | 6/2003 | Braunschadel | |
| 6,616,184 B2 | 9/2003 | Fischer | |
| 6,736,426 B2 | 5/2004 | Winters et al. | |
| 6,832,778 B2 | 12/2004 | Pinsenschaum et al. | |
| 6,843,157 B2 | 1/2005 | Hamilton et al. | |
| 6,886,338 B2 | 5/2005 | Fischer et al. | |
| 6,918,614 B2 | 7/2005 | Ryan | |

(Continued)

FOREIGN PATENT DOCUMENTS
WO  WO 2006/101588  9/2006

(Continued)

OTHER PUBLICATIONS

Notification of Transmittal of the International Search Report and the Written Opinion of the International Searching Authority issued Oct. 2, 2009 in International Application No. PCT/US2009/059379.

(Continued)

*Primary Examiner* — Paul N Dickson
*Assistant Examiner* — Drew Brown
(74) *Attorney, Agent, or Firm* — Sally J. Brown; Stoel Rives LLP

(57) ABSTRACT

An inflatable airbag cushion assembly with a release device and a release device mounting bracket. The release device is in electronic communication with at least one sensor in a vehicle and is configured to release one or more active vent tethers or airbag restraining tethers.

13 Claims, 9 Drawing Sheets

U.S. PATENT DOCUMENTS

| | | | |
|---|---|---|---|
| 6,932,384 B2 | 8/2005 | Waid et al. | |
| 6,932,385 B2 | 8/2005 | Hawthorn et al. | |
| 6,972,659 B2 | 12/2005 | Von Behrens et al. | |
| 6,981,374 B2 | 1/2006 | Von Behrens et al. | |
| 7,017,345 B2 | 3/2006 | Von Behrens et al. | |
| 7,021,657 B2 | 4/2006 | Kassman et al. | |
| 7,063,019 B2 | 6/2006 | Parks | |
| 7,063,377 B2 | 6/2006 | Thomas | |
| 7,086,297 B2 * | 8/2006 | Blakesley et al. | 73/862.474 |
| 7,111,871 B2 | 9/2006 | Thomas | |
| 7,249,783 B2 | 7/2007 | Parkinson et al. | |
| 7,261,320 B2 | 8/2007 | Fredin et al. | |
| 7,275,763 B2 * | 10/2007 | Thomas et al. | 280/743.2 |
| 7,374,205 B2 * | 5/2008 | Thomas | 280/743.2 |
| 7,419,184 B2 * | 9/2008 | Green et al. | 280/743.2 |
| 7,448,646 B2 * | 11/2008 | Hall et al. | 280/739 |
| 7,510,212 B2 | 3/2009 | Green et al. | |
| 7,607,689 B2 * | 10/2009 | Kalczynski et al. | 280/739 |
| 7,690,683 B2 * | 4/2010 | Parks et al. | 280/743.2 |
| 7,731,223 B2 * | 6/2010 | Lee et al. | 280/728.2 |
| 2002/0117840 A1 | 8/2002 | Dunkle | |
| 2002/0125705 A1 | 9/2002 | Wong et al. | |
| 2003/0034637 A1 | 2/2003 | Wang et al. | |
| 2003/0172750 A1 * | 9/2003 | Blakesley et al. | 73/862.393 |
| 2004/0012179 A1 | 1/2004 | Pinsenschaum et al. | |
| 2004/0012180 A1 | 1/2004 | Hawthorn et al. | |
| 2004/0046376 A1 | 3/2004 | Ryan | |
| 2004/0051285 A1 | 3/2004 | Fischer | |
| 2004/0112239 A1 | 6/2004 | Parks et al. | |
| 2004/0164526 A1 | 8/2004 | Hasebe et al. | |
| 2004/0232677 A1 | 11/2004 | Fischer et al. | |
| 2005/0040634 A1 | 2/2005 | Braun et al. | |
| 2005/0057027 A1 | 3/2005 | Fogle et al. | |
| 2005/0057030 A1 | 3/2005 | Fischer et al. | |
| 2005/0104347 A1 | 5/2005 | Hawthorn et al. | |
| 2005/0127648 A1 | 6/2005 | Fischer et al. | |
| 2005/0146122 A1 | 7/2005 | Gould et al. | |
| 2005/0161922 A1 | 7/2005 | Bilbrey et al. | |
| 2005/0212273 A1 | 9/2005 | Thomas et al. | |
| 2005/0225065 A1 | 10/2005 | Fujll | |
| 2005/0248137 A1 | 11/2005 | Delventhal et al. | |
| 2006/0012191 A1 | 1/2006 | Brei et al. | |
| 2006/0071461 A1 * | 4/2006 | Williams et al. | 280/739 |
| 2006/0151975 A1 | 7/2006 | Yamaji et al. | |
| 2006/0170202 A1 | 8/2006 | Block et al. | |
| 2006/0186655 A1 | 8/2006 | Ehrke | |
| 2006/0192370 A1 * | 8/2006 | Abe et al. | 280/735 |
| 2006/0214398 A1 | 9/2006 | Fredin et al. | |
| 2006/0214406 A1 | 9/2006 | Parkinson et al. | |
| 2006/0284404 A1 | 12/2006 | Green et al. | |
| 2006/0290117 A1 | 12/2006 | Fischer et al. | |
| 2007/0029762 A1 | 2/2007 | Katsuda et al. | |
| 2007/0040366 A1 | 2/2007 | Maidel et al. | |
| 2007/0108750 A1 | 5/2007 | Bauer et al. | |
| 2007/0170709 A1 | 7/2007 | Braun et al. | |
| 2007/0194561 A1 | 8/2007 | Thomas | |
| 2007/0205590 A1 | 9/2007 | Klinkenberger et al. | |
| 2007/0216146 A1 | 9/2007 | Williams et al. | |
| 2007/0252370 A1 | 11/2007 | Thomas | |
| 2008/0023950 A1 * | 1/2008 | Kalczynski et al. | 280/739 |
| 2008/0036188 A1 | 2/2008 | Gould et al. | |
| 2008/0203716 A1 * | 8/2008 | Parks et al. | 280/743.2 |
| 2008/0238050 A1 | 10/2008 | Green et al. | |
| 2008/0238062 A1 | 10/2008 | Parks et al. | |
| 2009/0039630 A1 * | 2/2009 | Schneider et al. | 280/740 |
| 2009/0230663 A1 * | 9/2009 | Mills et al. | 280/735 |
| 2009/0302588 A1 | 12/2009 | Schramm | |
| 2010/0078924 A1 * | 4/2010 | Mitsuo et al. | 280/743.2 |
| 2010/0090445 A1 | 4/2010 | Williams et al. | |

FOREIGN PATENT DOCUMENTS

| | | |
|---|---|---|
| WO | WO 2006/102432 | 9/2006 |
| WO | WO 2006/137989 | 12/2006 |
| WO | WO 2008/118526 | 10/2008 |
| WO | WO 2010/045040 | 4/2010 |

OTHER PUBLICATIONS

Notice of Allowance and Fee(s) Due issued Sep. 21, 2006 in U.S. Appl. No. 11/087,173, now U.S. Patent No. 7,261,320.

Office Action issued Oct. 3, 2006 in U.S. Appl. No. 11/087,476, now U.S. Patent No. 7,249,783.

Interview Summary issued Nov. 8, 2006 in U.S. Appl. No. 11/087,476, now U.S. Patent No. 7,249,783.

Amendment and Response filed Dec. 13, 2006 in U.S. Appl. No. 11/087,476, now U.S. Patent No. 7,249,783.

Notice of Allowance and Fee(s) Due issued Mar. 22, 2007 in U.S. Appl. No. 11/087,476, now U.S. Patent No. 7,249,783.

Restriction Requirement issued Aug. 13, 2007 in U.S. Appl. No. 11/154,126, now U.S. Patent No. 7,419,184.

Response to Restriction Requirement filed Nov. 8, 2007 in U.S. Appl. No. 11/154,126, now U.S. Patent No. 7,419,184.

Office Action issued Dec. 10, 2007 in U.S. Appl. No. 11/154,126, now U.S. Patent No. 7,419,184.

Amendment and Response filed Mar. 10, 2008 in U.S. Appl. No. 11/154,126, now U.S. Patent No. 7,419,184.

Notice of Allowance and Fee(s) Due issued Jun. 25, 2008 in U.S. Appl. No. 11/154,126, now U.S. Patent No. 7,419,184.

Office Action issued Feb. 23, 2009 in U.S. Appl. No. 11/728,688, now U.S. Patent No. 7,690,683.

Amendment and Response to Office Action filed Aug. 24, 2009 in U.S. Appl. No. 11/728,688, now U.S. Patent No. 7,690,683.

Notice of Allowance and Fee(s) Due issued Dec. 15, 2009 in U.S. Appl. No. 11/728,688, now U.S. Patent No. 7,690,683.

Office Action issued Jan. 8, 2008 in U.S. Appl. No. 11/728,815, now U.S. Patent No. 7,510,212.

Amendment and Response to Office Action filed May 8, 2008 in U.S. Appl. No. 11/728,815, now U.S. Patent No. 7,510,212.

Office Action issued Aug. 19, 2008 in U.S. Appl. No. 11/728,815, now U.S. Patent No. 7,510,212.

Amendment and Response to Office Action field Nov. 4, 2008 in U.S. Appl. No. 11/728,815, now U.S. Patent No. 7,510,212.

Notice of Allowance and Fee(s) Due issued Dec. 15, 2008 in U.S. Appl. No. 11/728,815, now U.S. Patent No. 7,510,212.

Office Action issued Apr. 5, 2010 in U.S. Appl. No. 12/134,021, now published as US-2009/0302588.

Notification of Transmittal of the International Search Report and the Written Opinion of the International Searching Authority issued Oct. 20, 2006 in International Application No. PCT/US2006/002690.

Notification of Transmittal of the International Search Report and the Written Opinion of the International Searching Authority issued Jan. 9, 2007 in International Application No. PCT/US2006/010441.

Notification of Transmittal of the International Search Report and the Written Opinion of the International Searching Authority issued Sep. 25, 2007 in International Application No. PCT/US2006/017126.

Notification of Transmittal of the International Search Report and the Written Opinion of the International Searching Authority issued Jul. 31, 2008 in International Application No. PCT/US2008/052266.

Supplementary European Search Report issued May 25, 2009 in European Patent Application No. 06719524.8.

Supplementary European Search Report issued May 12, 2009 in European Patent Application No. 06748559.9.

* cited by examiner

FIG. 1

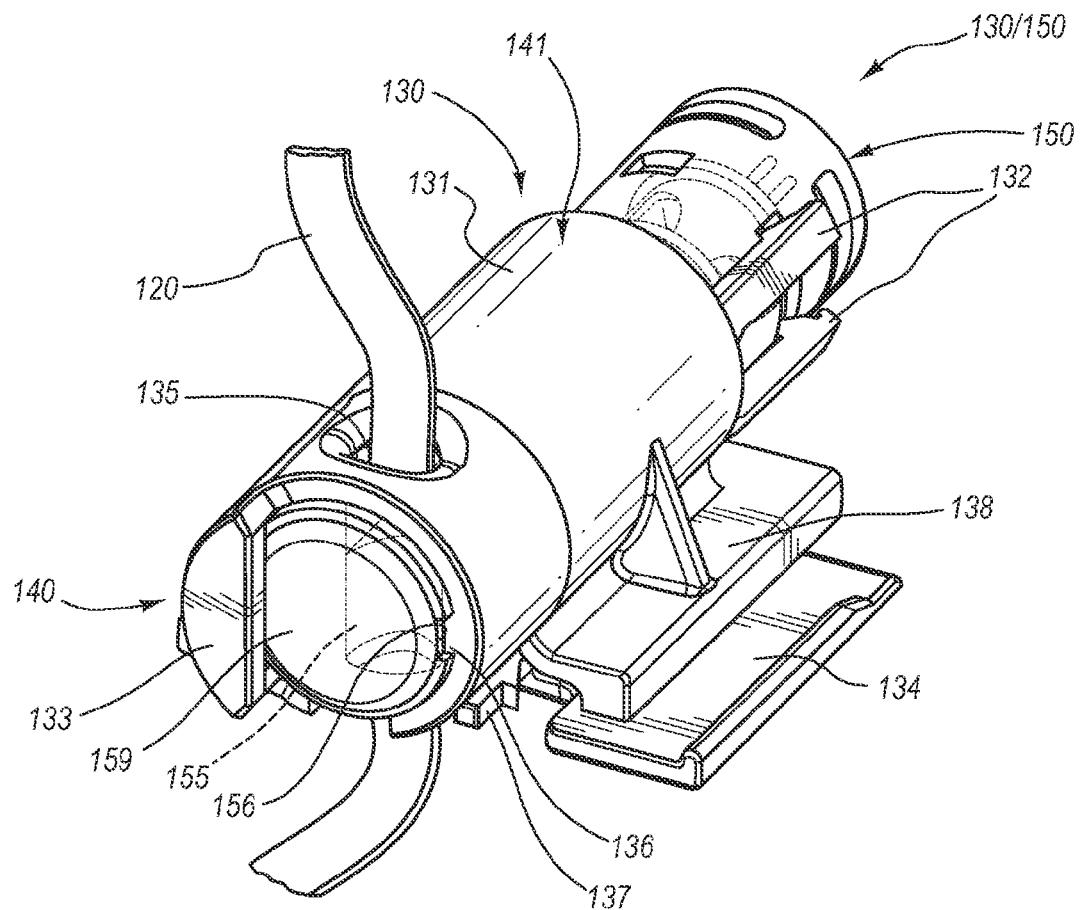
FIG. 6
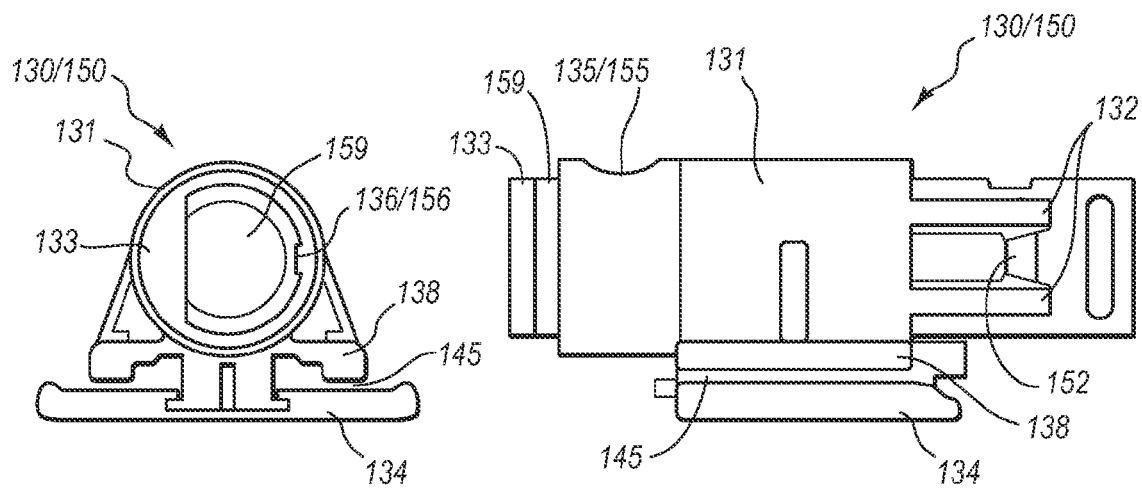
FIG. 7     FIG. 8

MOUNTING BRACKET FOR TETHER RELEASE MECHANISM

TECHNICAL FIELD

The present disclosure relates generally to the field of automotive protective systems. More specifically, the present disclosure relates to inflatable airbag cushion assemblies.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

FIG. 1 is a perspective view of an airbag assembly, wherein active vent tethers have not been released.

FIG. 6 is a perspective view of the tether release mechanism of FIG. 4 after it has been received by the bracket of FIG. 3.

FIG. 7 is a front elevation view of the tether release mechanism of FIG. 4 after it has been received by the bracket of FIG. 3.

FIG. 8 is a side elevation view of the tether release mechanism of FIG. 4 after it has been received by the bracket of FIG. 3.

Figure 2:
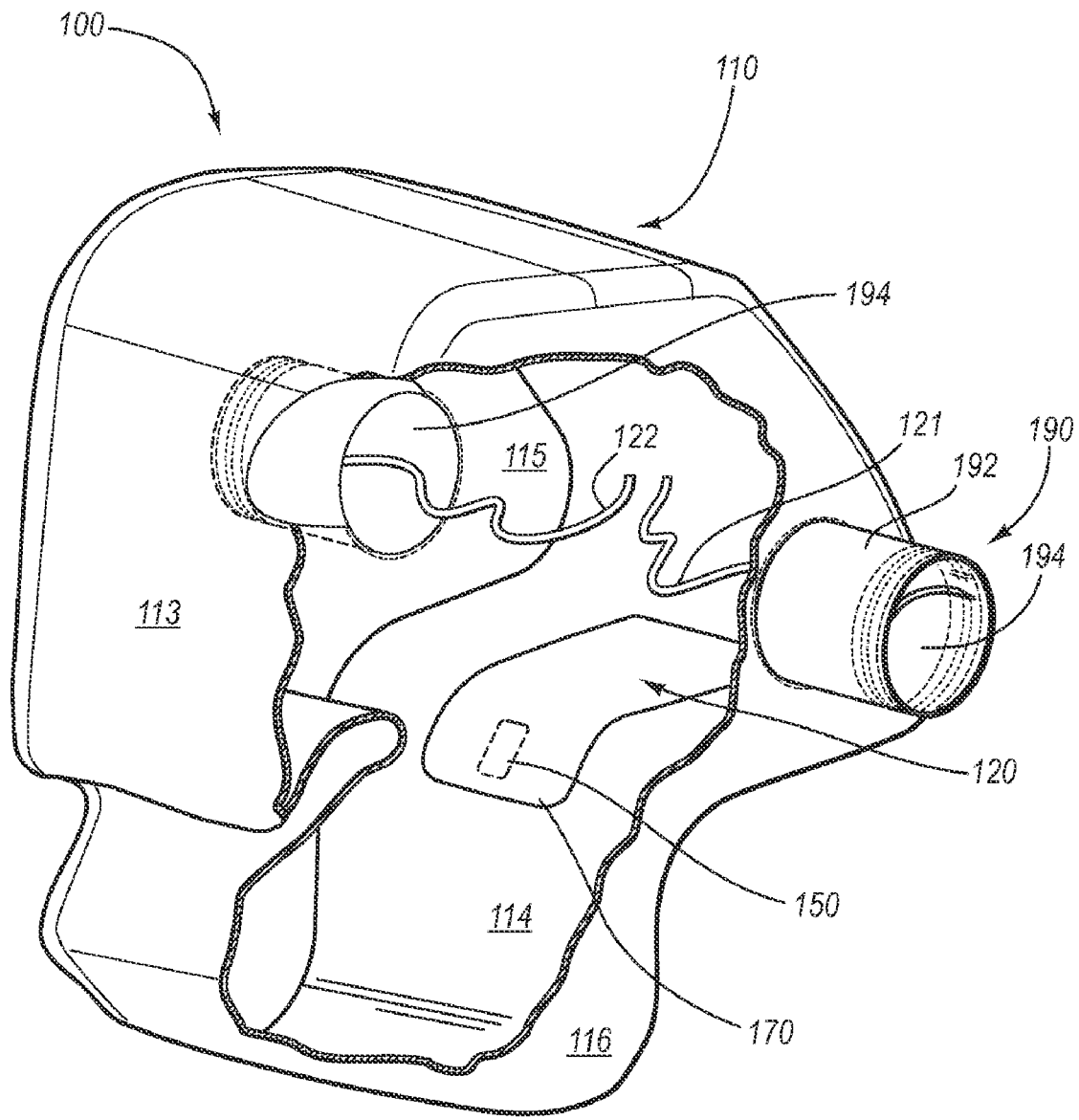
FIG. 2 is a perspective view of the airbag assembly of FIG. 1, wherein the active vent tethers have been released.

INDEX OF ELEMENTS IDENTIFIED IN THE DRAWINGS 100 inflatable cushion air bag assembly
101 cover
102 mounting brackets
103 mounting hardware
106 soft pack
107 tether aperture
108 gas inlet
110 cushion membrane
111 upper portion
112 lower portion
113 front face
114 rear face
115 first side face
116 second face
118 inflatable void
120 active vent tether strap
121 first end of strap
122 middle portion of strap
123 second end of strap
129 loop of strap
130 release mechanism bracket
131 body of bracket
132 clips
133 stop
134 vibration damping feature
135 aperture for tether
136 guide
137 housing attachment features
138 base
139 lumen
140 first end of bracket
141 second end of bracket
142 support structure
145 gap
150 release mechanism
151 body of release mechanism
152 depression for receiving clips
153 sidewall of mechanism
154 cutting member
155 aperture for receiving tether
156 depression
157 actuator
159 top of release mechanism
160 retainer ring
161 mounting stems
166 inflator
170 housing
171 aperture for inflator
172 slot
180 bottom bracket
190 active vent
192 vent side panel
194 vent aperture
200 airbag assembly
203 mounting hardware
205 cushion assembly
207 tether aperture
220 tether strap
229 loop of strap
230 mounting bracket
250 release mechanism
260 retainer
261 mounting stem
262 upper portion
263 lower portion
266 inflator

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" may refer to an inflatable curtain airbag, overhead airbag, front airbag, or any other airbag type.

Front airbags are typically installed in the steering wheel and instrument panel of a vehicle. During installation, the airbags are rolled, folded, or both, and are retained in the rolled/folded state behind a cover. During a collision event, vehicle sensors trigger the activation of an inflator, which rapidly fills the airbag with inflation gas. Thus the airbag rapidly changes confirmations from the rolled/folded configuration to an expanded configuration.

Figure 1:
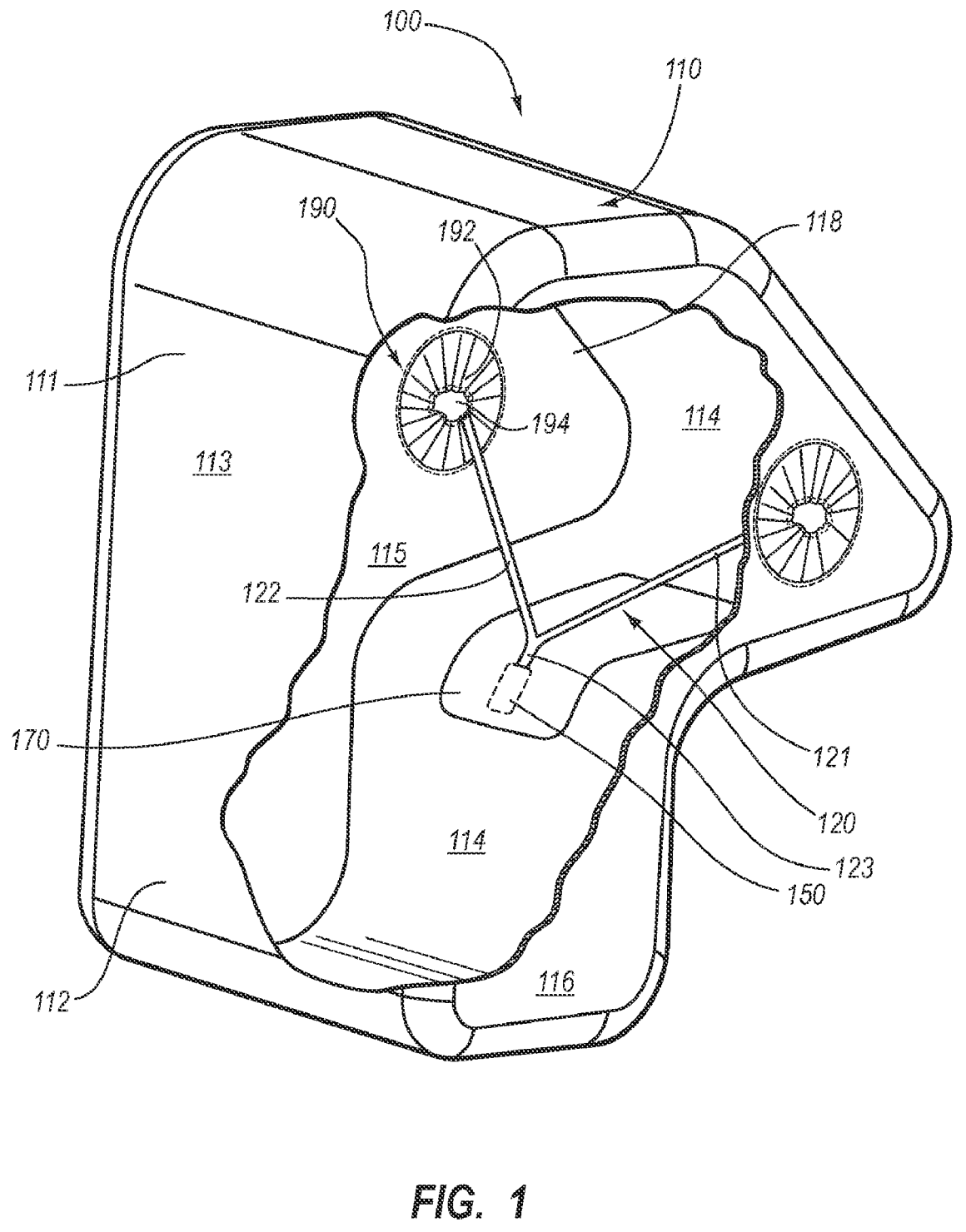

FIGS. 1-2 depict airbag assembly 100, from perspective views. Airbag assembly 100 may comprise an inflatable cushion membrane 110, a housing 170, an inflator (not visible), an active vent 190, a active vent tether strap 120, a tether release mechanism 150, and a mounting bracket (not visible) for the tether release mechanism. Additionally, assembly 100 may comprise one or more sensors that relay vehicle, accident, and/or occupant characteristics to the inflator and/or the tether release mechanism. Assembly 100 is configured such that the inflatable cushion can dynamically compensate for the presence of a small occupant or an out of position occupant. Also, assembly 100 may used to provide optimized cushioning for an occupant that is wearing a seat belt. These features and characteristics are at least partially accomplished by employing a system of active vents and vent tethers to vary the amount of inflation gas that is retained within the cushion during deployment.

According to the embodiment depicted in FIGS. 1-2, cushion 110 has an upper portion 111, a lower portion 112, a front face 113, a rear face 114, a first side face 115, and a second side face 116. The various faces of cushion membrane 110 define an interior inflatable void 118, which is in fluid communication with an inflator. The various faces of cushion 110 may be attached to each other using seams that comprise stitching.

Upper portion 111 of cushion 110 is the portion of the cushion that is closest to the headliner of a vehicle when the cushion is in a deployed state. Lower portion 112 is below upper portion 111 when cushion 110 is in a deployed state, and is closest to a floor of the vehicle. The term "lower portion" is not necessarily limited to the portion of cushion 110 that is below a horizontal medial plane of the cushion, but may include less than half, more than half or exactly half of the bottom portion of the cushion. Likewise, the term "upper portion" is not necessarily limited to the portion of cushion 110 that is above a horizontal medial plane of the cushion, but may include less than half, more than half or exactly half of the top portion of the cushion.

As will be appreciated by those skilled in the art, a variety of types and configurations of airbag cushion membranes can be utilized without departing from the scope and spirit of the present disclosure. For example, the size, shape, and proportions of the cushion membrane may vary according to its use in different vehicles or different locations within a vehicle such that the cushion may comprise an inflatable curtain cushion; a rear passenger side airbag; a driver's airbag; and/or a front passenger airbag. Also, the cushion membrane may comprise one or more pieces of any material well known in the art, such as a woven nylon fabric. Additionally, the airbag cushion may be manufactured using a variety of techniques such as one piece weaving, "cut and sew", or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques.

One skilled in the art will also appreciate that the retention of inflation gas within the cushion can be modulated by the presence of one or more fixed or discrete vents, which are configured to allow for inflation gas to exit the interior of the cushion. Further, in order for a fully inflated shape of an airbag cushion membrane to adopt a predetermined shape, internal and external tethers may be used, wherein the tethers limit the expansion of the airbag and restrict it to a specific shape. Tethers are typically coupled to one or more surfaces of a cushion membrane and extend to another surface of the cushion, the airbag housing, or a vehicle structure.

Tethers 120 may comprise a tether strap of a fabric such as a woven nylon. Tethers 120 may comprise a first end 121, an elongated middle portion 122, and a second end 123, wherein the first end is coupled to one or more active vents 190, the middle portion extends towards release device 150, and the second end is coupled to the release device. In the depiction of FIG. 1, the first ends 121 of one or more tethers 120 are coupled to one or more active vents 190. The middle portions 122 extend toward each other and are coupled together such that the two tethers comprise a single second end 123 that is coupled to release device 150. Second end 123 may be configured in a loop that is captured by release device 150. In a alternative embodiments, the two tethers may not be coupled together but may be independently coupled to the release device and may or may not be independently released by the release device.

Housing 170 may comprise a metal container that is fixedly attached to cushion 110 via a throat portion of the cushion. Housing 170 is configured to be mounted within a vehicle and serves to specifically position airbag assembly 100 so that the cushion may deploy with predetermined characteristics. In the packaged, undeployed state, cushion 110 is contained within housing 170. Housing 170 is configured to allow for fluid communication between void 118 of cushion 110 and an inflator (not shown).

Release device 150 is coupled to housing 170 via a mounting bracket and may be in electronic communication with one or more sensors that identify occupant characteristics such as weight, surface area, the position of the occupant's seat via a seat rail sensor, and/or whether an occupant's seat belt is buckled via a buckle sensor. In the depiction of FIG. 1, cushion membrane 110 is in a deployed state, wherein tethers 120 have not been released. As cushion 110 expands due to the force of inflation gas, tethers 120 become taut and place tension on active vents 190 such that vent side panels 192 reduce the size of vent apertures 194 and thereby reducing the amount of inflation gas that can exit the cushion. This provides a firmer cushion, which may be preferred in some airbag deployment scenarios.

As will be appreciated by those skilled in the art, a variety of types and configurations of active or dynamic vents can be utilized without departing from the scope and spirit of the present disclosure. The active vents may be configured to change configurations during the course of airbag deployment or remain in or adopt an open configuration if an obstruction such as an out of position occupant is encountered, or to provide optimized cushioning for an occupant wearing a seat belt. For example, the active vent may be configured to change from an open state during initial airbag deployment to an at least partially closed state later in airbag deployment. One type of closeable vent that may be used is a cinch tube vent of the type found in U.S. patent application Ser. No. 10/959,256 filed on Oct. 6, 2004, and published as U.S. Patent Publication No. 2006/0071461, which is hereby incorporated by reference.

FIG. 2 depicts airbag assembly 100 from a perspective view, wherein tether release mechanism 150 has released second end 123 of tethers 120 such that side panels 192 of active vents 190 do not reduce the diameter of vent apertures 194. In the scenario of FIG. 2, tether release mechanism 150 received a signal to release vent tethers 120. The signal may originate from one or more vehicle and/or occupant sensors; signals from multiple sensors may be processed and correlated such that a single signal is sent to the release device. Occupant characteristics and conditions that may result in a signal to the release device to release the tethers include: an out of position occupant such as wherein the occupant is too close to the instrument panel from which the airbag will deploy; a small occupant; a large or small occupant that is wearing a seat belt, and a collision wherein the forces generated are below a predetermined magnitude.

Information from one or more sensors may be used to instruct the tether release mechanism whether to release the tether(s) before or during inflatable cushion deployment. For example, information from a single sensor may be given priority over other information from other sensors (if present) such that upon deployment the tether release mechanism will release the tethers upon inflatable cushion deployment. However, it is possible for assembly 100 and any associated sensors to be configured such that the tether release mechanism may be activated during inflatable cushion deployment. For example, this scenario may occur when input from one or more sensors initially instructs the release mechanism not to release the tether(s), but at some time during inflatable cushion deployment one or more sensors detects a strain being placed on a seat belt that is greater than a predetermined magnitude, wherein the sensor instructs the tether release mechanism to release the tether(s). Seat belt strain during an accident may exceed a predetermined magnitude if a large occupant is wearing a seatbelt. Also, a large magnitude of strain may be placed on a seat belt if a small person is wearing the seat belt, but vehicle accident forces are sufficient to generate the strain.

Figure 3:
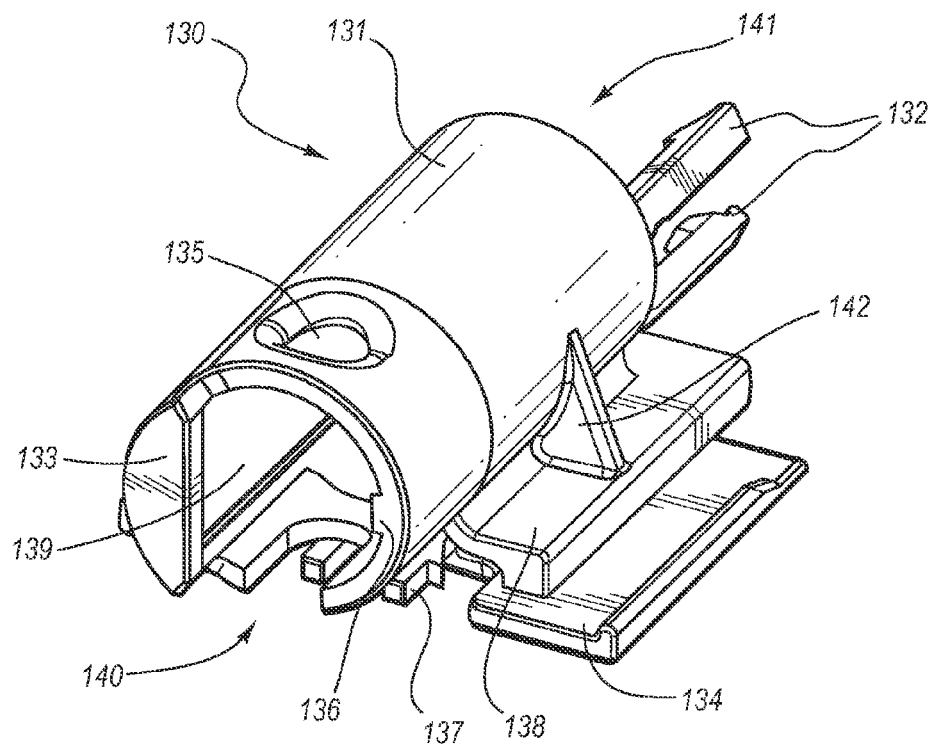
FIG. 3 is a perspective view of a tether release bracket, which is a component of the airbag assembly of FIG. 1.

FIG. 3 is a perspective view of mounting bracket 130 for a release mechanism that is configured to couple the release mechanism to an airbag housing such as housing 170 depicted in FIG. 1. Bracket 130 may comprise one or more work pieces coupled together or in other words, the bracket may be formed from one or more materials. The bracket may comprise plastic, such as 30% glass filled Nylon, which is well known in the art. Bracket 130 may comprise a body 131, clips 132, a stop 133, a vibration damping feature 134, a tether aperture 135, a guide 136, attachment features 137, a base 138, a lumen 139, a first end 140 and a second end 141. Body 131 comprises a cylinder that is at least partially open on first and second ends 140 and 141 and forms a lumen 139 that is configured to receive the release mechanism. Vibration damping feature 134 and base 138 may comprise flexible resilient materials, which may be the same material from which other portions of the bracket are manufactured, or may comprise different materials.

Figure 4:
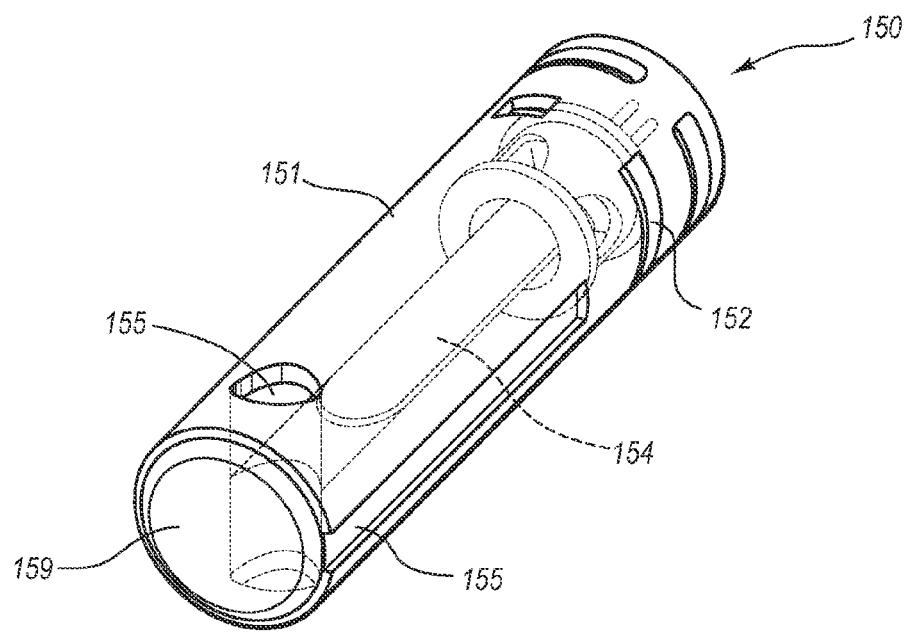
FIG. 4 is a perspective view of one embodiment of a tether release mechanism, which is another component of the airbag assembly of FIG. 1.
Figure 5A:
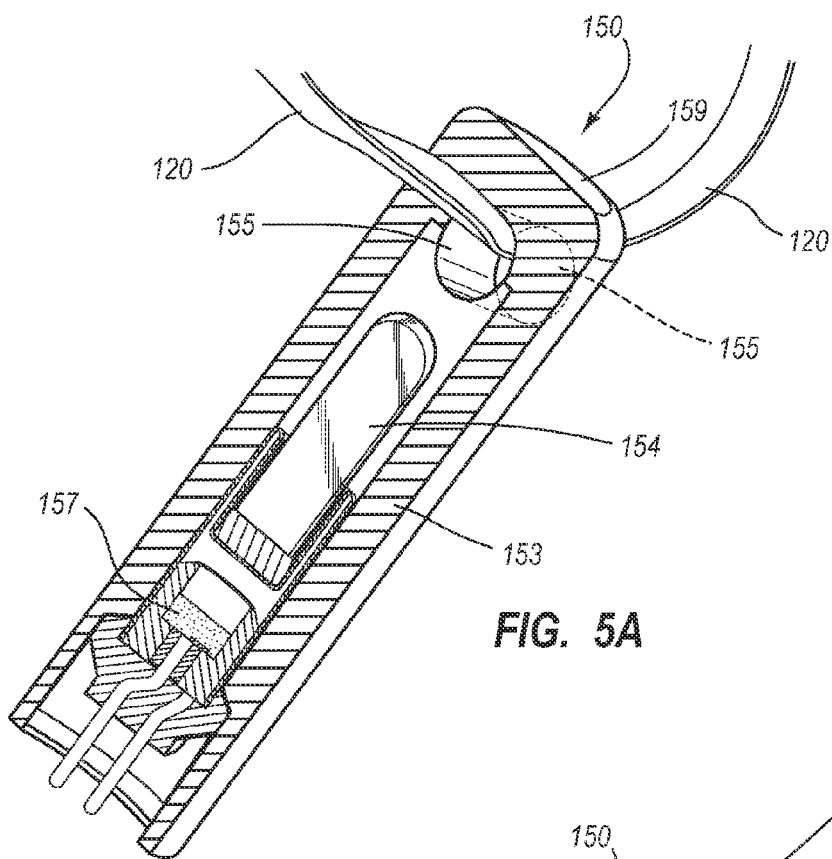
FIG. 5A is a cross sectional view of the tether release mechanism of FIG. 4 before the release mechanism has been activated.
Figure 5B:
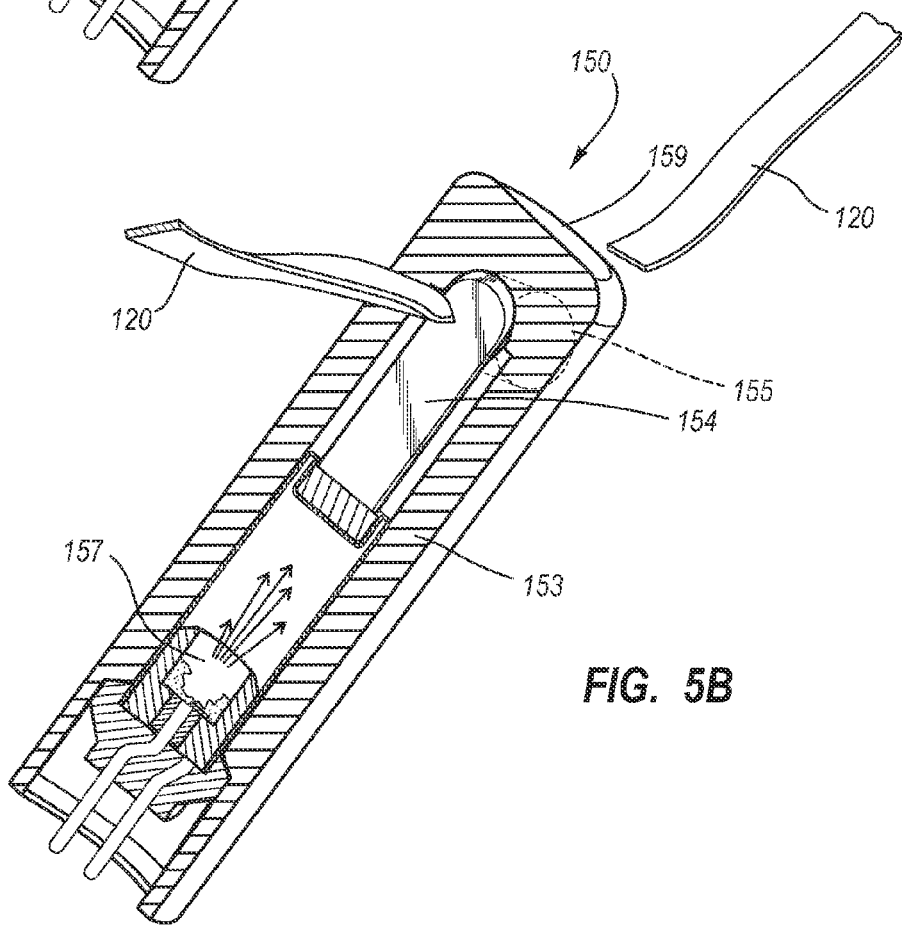
FIG. 5B is a cross sectional view of the tether release mechanism of FIG. 5A after the release mechanism has been activated.

FIGS. 4-5B depict release mechanism 150, wherein the release mechanism comprises a body 151, clip receiving depression 152, side walls 153, a cutting member 154, a tether aperture 155, a depression 156, an actuator 157, and a top 159. In the depiction of FIG. 5A, tether 120 extends through tether aperture 155, but for clarity, the figure does not depict an end portion of the tether forming a loop. In the depiction of FIG. 5B, tether cutting member 154 has been mobilized by actuator 157 such that the cutting member severs tether 120. In the depicted embodiment, the actuator comprises a pyrotechnic squib; however, in alternative embodiments, the actuator may comprise some other mechanism or technique for actuating the release device.

FIGS. 6-8 are perspective, front side elevation, and side elevation views of bracket 130 and tether release mechanism 150, wherein the release mechanism has been received by the bracket. Top portion 159 of release mechanism 150 is configured to be introduced into the lumen of the bracket via second end 141. Depression 156 of the release mechanism is configured to receive guide 136 of the bracket such that the release mechanism is oriented in a predetermined position within the bracket. Guide 136 may extend the length of bracket body 131 or may only extend a portion of the length of the body. Further, the guide may be said to protrude from a rim portion of the body and may not extend along body 131.

The release mechanism can be pushed toward first end 140 until top 159 hits stop 133 and/or until clips 132 engage clip depressions 152. In alternative embodiments, clips 132 and depressions 152 may comprise other interacting structures such has clips and release mechanism protrusions; clips and apertures; one or more deformable materials, wherein a portion of the release mechanism and/or bracket are deformed around a portion of the bracket and/or release mechanism; and one or more mounting stems and apertures along with mounting hardware.

In the depicted embodiment, tether 120 protrudes through tether aperture 135 in the bracket and aperture 155 in the release mechanism. Base portion 138 and vibration damping feature 134 at least partially define a gap 145 that is configured to receive a portion of the airbag housing (not shown). Bracket 130 may further comprise one or more support structures 142.

Figure 9A:
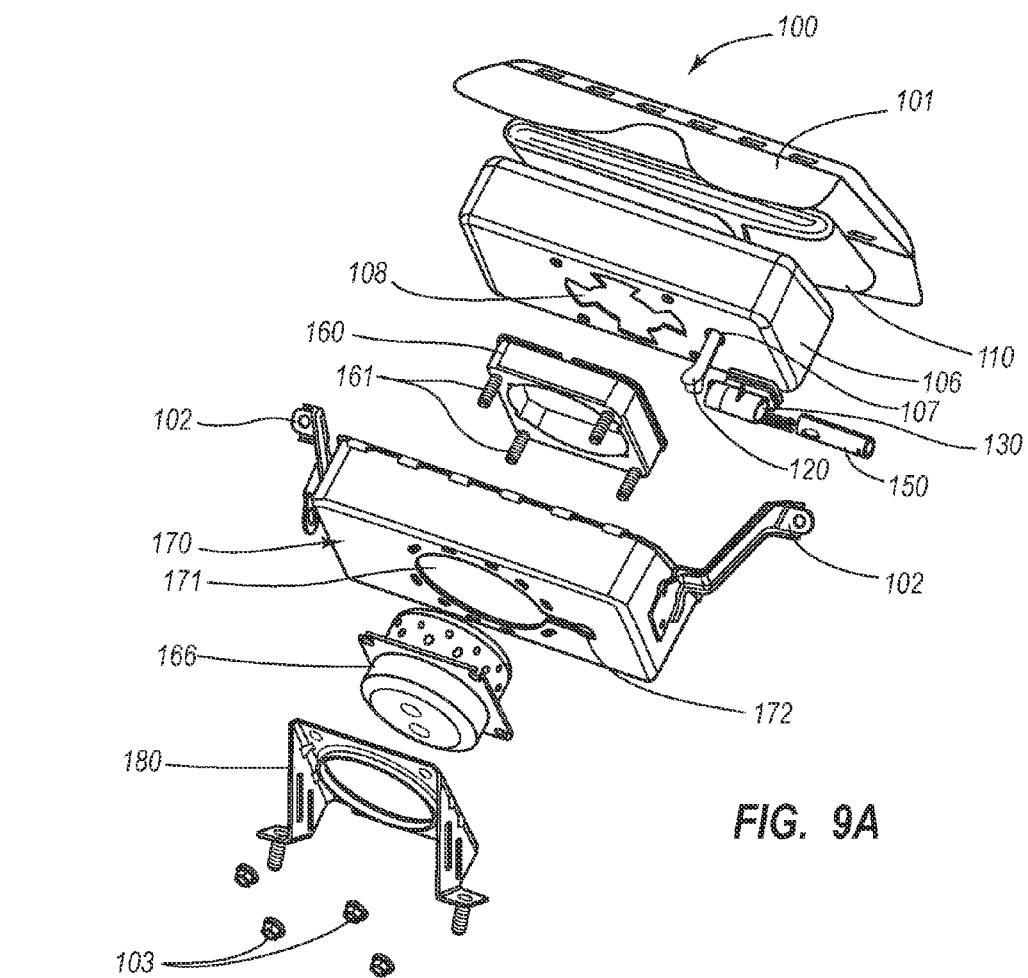
FIG. 9A is an exploded perspective view of an airbag assembly.
Figure 9B:
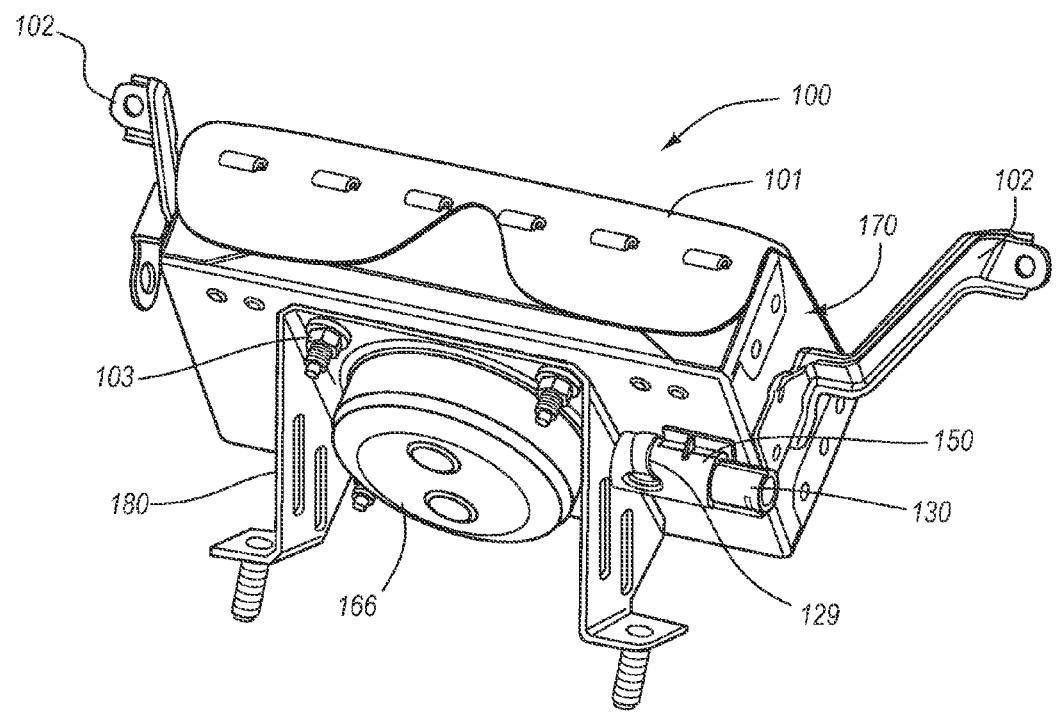
FIG. 9B is a perspective view of the airbag assembly of FIG. 9A after the assembly has been assembled.

FIGS. 9A and 9B depict airbag assembly 100 from an exploded perspective view and a perspective view wherein the assembly is assembled. Assembly 100 may comprise a cover 101, mounting brackets 102, mounting hardware 103, a soft pack 106, a cushion membrane 110, an active vent tether 120, a release mechanism bracket 130, a release mechanism 150, a retainer ring 160, an inflator 166, a housing 170, and a bottom bracket 180.

Soft pack 106 comprises a gas inlet 108 and a tether aperture 107, wherein an active vent tether 120 protrudes through the tether aperture. Soft pack 106 is configured to receive a folded and/or rolled cushion membrane 110, and is configured to be coupled to airbag housing 170 via a retaining ring 160. Retaining ring 160 comprises mounting stems 161 that are configured to protrude through complementary apertures in housing 170, inflator 166, and bottom bracket 180. Housing 170 may have mounting brackets 102 attached to it and may comprise an inflator aperture 171 and a slot 172. Slot 172 is configured to receive release mechanism mounting bracket 130 and tether 120. As depicted in FIG. 9B, loop 129 of tether 120 and mounting bracket 130 protrude through slot 172 (not visible) in housing 170.

The inflator is configured to be activated in response to predetermined vehicle conditions as determined by vehicle sensors. Upon activation, the inflator rapidly generates or releases inflation gas, which forces the airbag cushion through the cosmetic cover and rapidly inflates the cushion. The inflator may be one of several types, such as pyrotechnic, stored gas, or a combination inflator. Additionally, the inflator may comprise a single or multistage inflator.

As will be appreciated by those skilled in the art, a variety of types and configurations of airbag housings can be utilized without departing from the scope and spirit of the present disclosure. For example, in one embodiment, the housing comprises fabric that may or may not further comprise a mounting structure. Also, the housing may have an integrated inflator, or the housing may used to mount the inflator with the vehicle. Alternatively, the housing may not connect to the inflator and a path of inflation gas travel may not flow through the housing. Additionally, in the packaged state, a deployment flap may be disposed between the inflatable cushion membrane and a top portion of the housing, which may comprise a cosmetic cover. During airbag deployment, the deployment flap may function to protect the cushion membrane from damage caused by the housing, cosmetic cover edges, or other structures disposed near the housing and in the path of the deploying cushion membrane.

Figure 10:
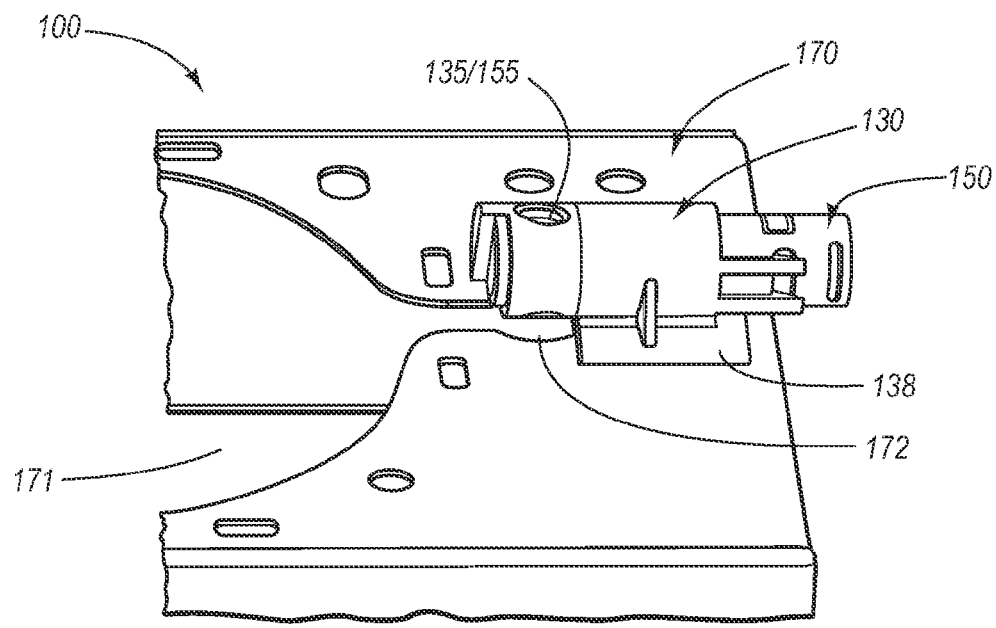
FIG. 10 is a perspective view of a portion of the airbag assembly of FIG. 9B.
Figure 11:
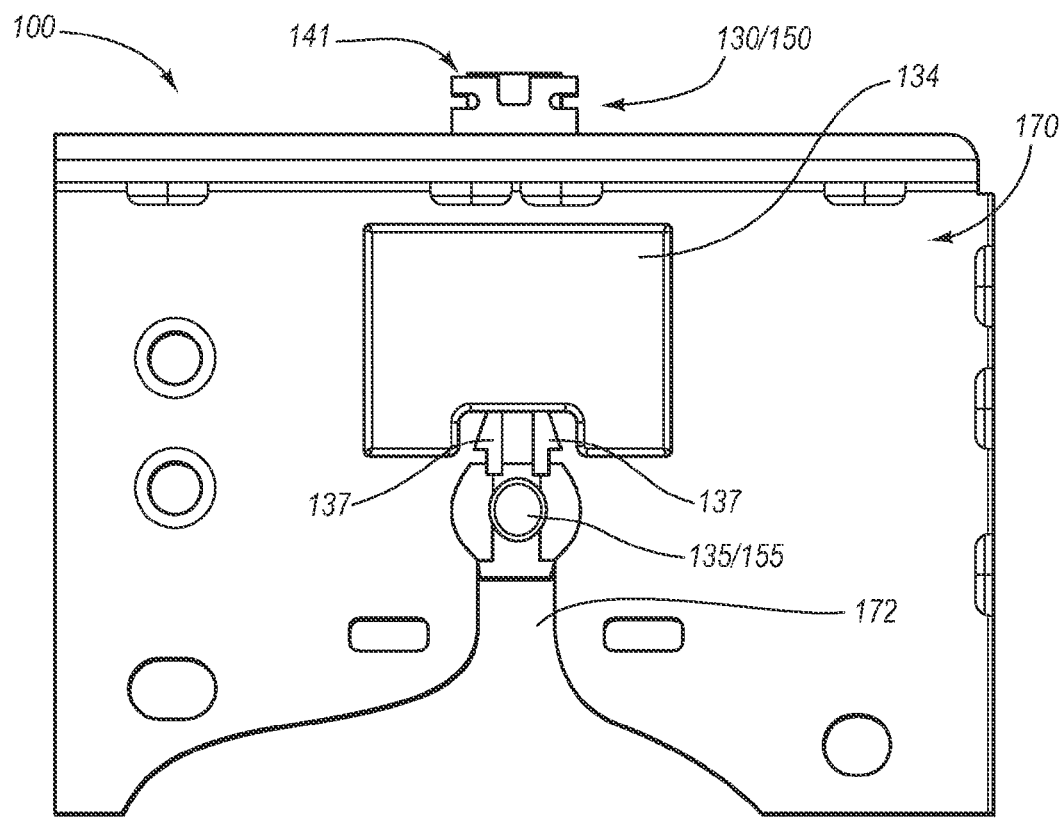
FIG. 11 is a bottom elevation view of a portion of the airbag assembly of FIG. 9B.

FIGS. 10 and 11 are cutaway views of a portion of airbag assembly 100, wherein FIG. 10 is a perspective view of a bottom side of housing 170, and FIG. 11 is a top elevation view of the housing; in both figures release mechanism 150 and mounting bracket 130 are visible. Housing 170 comprises an inflator aperture 171 and a slot 172, wherein the slot is configured to allow mounting bracket 130 to be attached to the housing. Additionally, slot 172 is configured to allow an active vent tether to extend from within an airbag cushion through the slot and through tether apertures 135 and 155 in the bracket and release mechanism. When bracket 130 is attached to housing 170, base 138 is located on one side of the housing and vibration damping feature 134 is located on an opposite side of the housing. In other words, gap 145 (depicted in FIGS. 7 and 8) receives the sides of slot 172. Base 138 and vibration damping feature 134 are configured to produce a clamping force on housing 170 and also allow for a variety of housing thicknesses to be accommodated. Additionally, attachment features 137 may be present on bracket 130 and may be employed to further secure the bracket to housing 170. Attachment features 137 may comprise a clip that interacts with complementary features in housing slot 172.

Figure 12A:
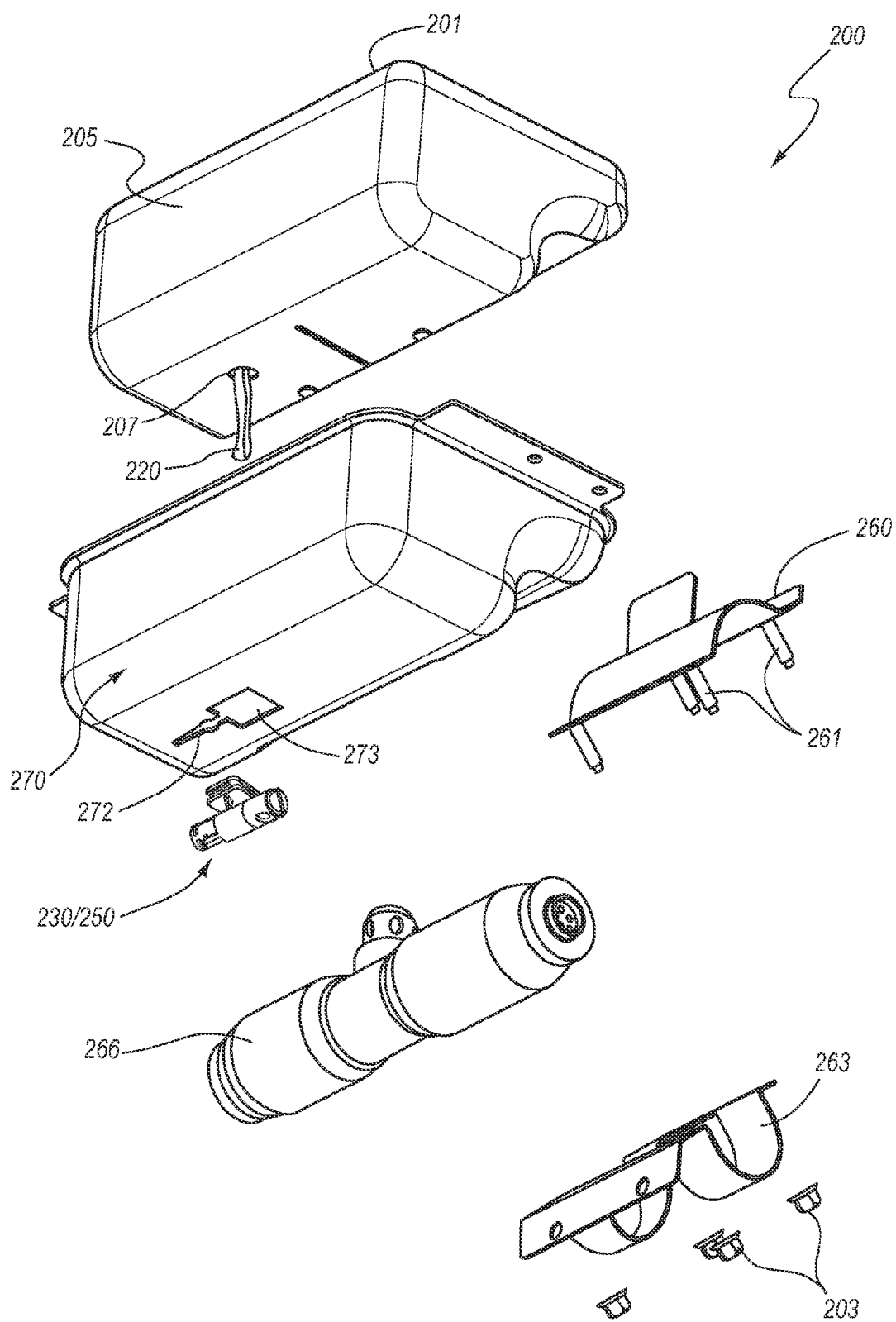
FIG. 12A is an exploded perspective view of another embodiment of an airbag assembly.
Figure 12B:
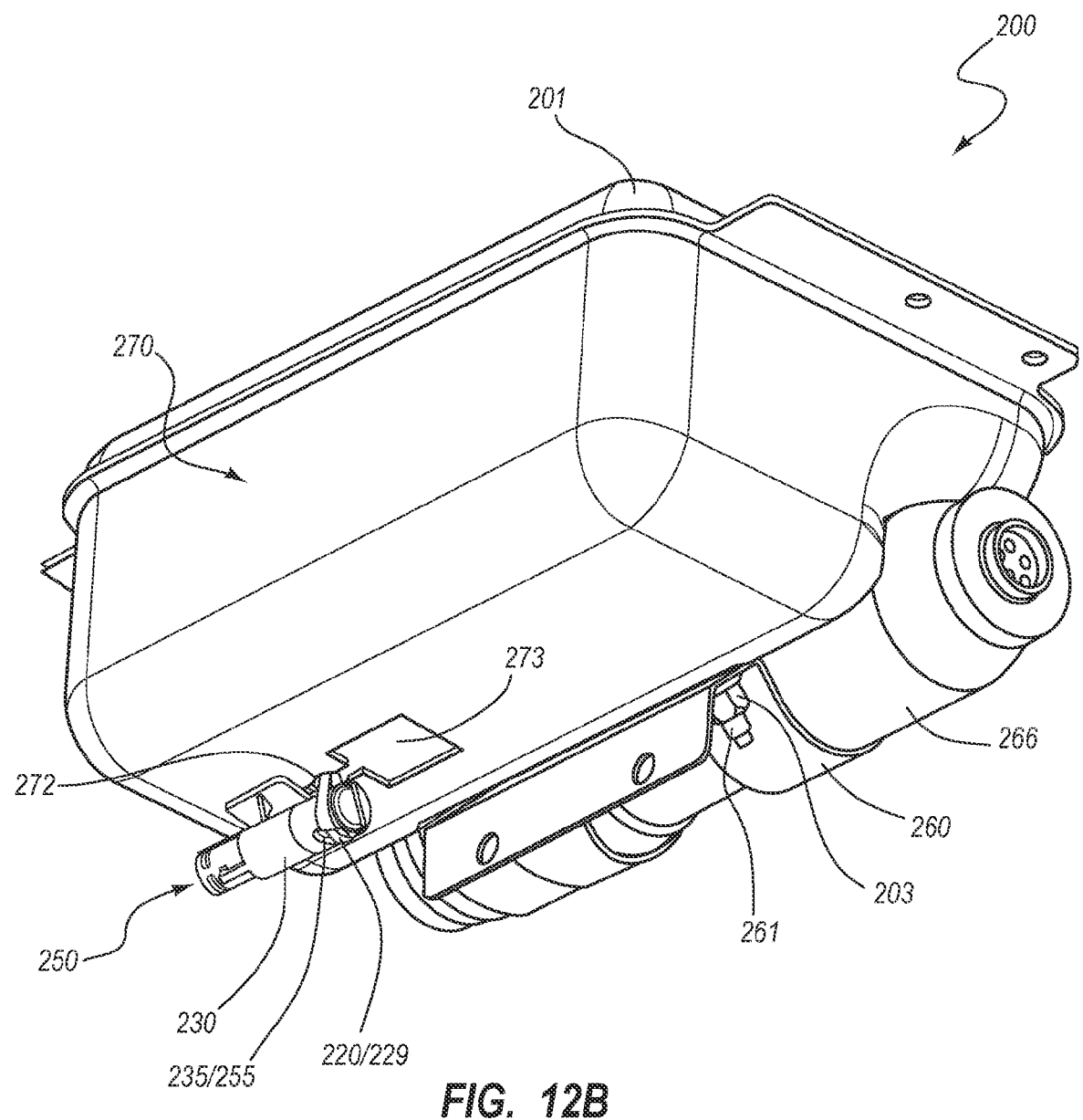
FIG. 12B is a perspective view of the airbag assembly of FIG. 12A after the assembly has been assembled.

FIGS. 12A and 12B depict airbag assembly 200, wherein FIG. 12A is an exploded perspective view, and FIG. 12B is a perspective view after the assembly has been assembled. Assembly 200 may be configured similarly to and may function similarly as airbag assembly 100, described herein. Assembly 200 may comprise a cover 201, a cushion assembly 205, a release mechanism 250, a mounting bracket for release mechanism 230, an inflator 266, a mounting bracket 260, and a housing 270. Cushion assembly 205 may comprise a folded inflatable airbag cushion membrane (not visible) and an active vent tether strap 220 that protrudes through an aperture 207 in the cushion assembly.

Release mechanism 250 may be configured similarly and may function similarly as release mechanism 150, although in alternative embodiments, the release mechanism may vary from that depicted. Release mechanism 250 is received by mounting bracket 230 and the mounting bracket is configured to be coupled to housing 270. Mounting bracket 230 may be configured similarly to mounting bracket 130. Housing 270 may comprise a slot 272 through which tether strap 220 may protrude and the slot may also be configured to allow mounting bracket 230 to be coupled to the housing. The housing may also comprise an aperture 273 that is configured to aid in the coupling of the mounting bracket to the housing. Once assembled, as depicted in FIG. 12B, tether strap 220 may form a loop 229 that partially protrudes through apertures 235 and 255 of mounting bracket 230 and release mechanism 250.

Another mounting bracket 260 may be configured to couple inflator 166 to housing 270 and may also aid in anchoring assembly 200 within a vehicle. Bracket 260 may comprise an upper portion 262 and a lower portion 263 that may be coupled together via mounting stems 261 and hardware 203. Bracket 260 may be configured to specifically position inflator 266 such that a gas outlet portion of the inflator is aligned with a gas inlet portion of the cushion membrane via one or more apertures in cushion assembly 205 and housing 270.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Without further elaboration, it is believed that one skilled in the art can use the preceding description to utilize the present disclosure to its fullest extent. The examples and embodiments disclosed herein are to be construed as merely illustrative and not a limitation to the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the disclosure is therefore defined by the following claims.

The invention claimed is:

1. A release mechanism bracket configured to receive a tether release mechanism and further configured to be attached to an airbag housing, wherein the bracket and the release mechanism both comprise an aperture through which a tether may protrude, wherein the bracket comprises a first end, a second end, and a body portion that forms a lumen, the bracket configured to receive the release mechanism into the lumen via the second end, wherein the first end comprises a guide that is configured to interact with a complementary structure on the release mechanism such that the release mechanism adopts a predetermined orientation within the mounting bracket.

2. The release mechanism bracket of claim 1, wherein the first end comprises a stop such that the release device cannot be inserted into the bracket beyond a predetermined distance.

3. The release mechanism bracket of claim 1, wherein the second end comprises one or more clips that interact with complementary structures on the release mechanism.

4. The release mechanism of claim 3, wherein the complementary structures comprise one or more apertures for receiving the mounting bracket clips.

5. The release mechanism bracket of claim 1, wherein the guide comprises an extension and the corresponding structure on the release mechanism comprises a depression that is configured to receive at least a portion of the guide.

6. A release mechanism bracket configured to receive a tether release mechanism and further configured to be attached to an airbag housing, wherein the bracket and the release mechanism both comprise an aperture through which a tether may protrude,
 wherein the bracket comprises a base portion and a vibration damping feature,
 wherein the base portion and vibration damping feature are configured to form a gap between them that may receive a portion of the airbag housing and exert a squeezing force on the portion of the housing thereby at least partially allowing the bracket to be coupled to the housing.

7. The release mechanism bracket of claim 6, wherein the vibration damping feature comprises a resilient material such that a predetermined range of airbag housing thicknesses can be accommodated within the gap formed by the base and the vibration damping feature.

8. The release mechanism bracket of claim 6, wherein the bracket comprises one or more housing attachment features.

9. The release mechanism bracket of claim 8, wherein the attachment features comprise clips that are configured to interact with complementary features in the airbag housing.

10. An airbag assembly, comprising:
 an airbag housing comprising an aperture for receiving an inflator and a slot that extends away from the aperture such that the slot is open on a first end and closed on a second end;
 a release mechanism bracket configured to be attached to the housing; and,
 a release mechanism configured to be received by the release mechanism bracket,
  wherein the slot in the housing comprises an enlarged portion that is configured to allow a tether to protrude through the enlarged portion.

11. The airbag assembly of claim 10, wherein the tether comprises a vent tether.

12. An assembled airbag assembly, comprising:
 an inflatable cushion membrane, wherein the cushion membrane has been placed in a pre-deployment configuration by subjecting the cushion membrane to a packaging technique chosen from the group consisting of rolling, folding, and rolling and folding, the cushion membrane further comprising:
 an active vent; and,
 a vent tether;
 an airbag housing that at least partially surrounds the packaged inflatable cushion membrane, wherein the housing comprises a planar bottom portion with an inflator aperture and a slot that has a first end that is contiguous with the inflator aperture, a middle portion that extends away from the inflator aperture, and a second end that terminates before the slot extends through a side wall such that the middle portion and the second end are defined by rims of the bottom portion that are defined by the thickness of the planar bottom portion of the housing,
 a release mechanism bracket comprising an aperture, a base and a vibration damping feature, wherein the base and the vibration damping feature define a gap that receives the rims of the housing that define the middle portion and the second end of the slot; and,
 a release mechanism received within the release mechanism bracket, wherein the release mechanism comprises an aperture that is aligned with the aperture in the release mechanism bracket.

13. The airbag assembly of claim 12, wherein a portion of the vent tether extends through the apertures in the release mechanism and release mechanism bracket and is anchored such that during airbag cushion membrane deployment, if the release mechanism does not release the vent tether, the vent tether may apply tension to the active vent.

* * * * *